Aug. 11, 1925.

P. SAEGESSER 1,548,904

CREAM SEPARATOR DISK WASHER

Filed Aug. 21, 1922 — 2 Sheets-Sheet 1

Inventor
Paul Saegesser
By Lancaster and Allwine
Attorneys

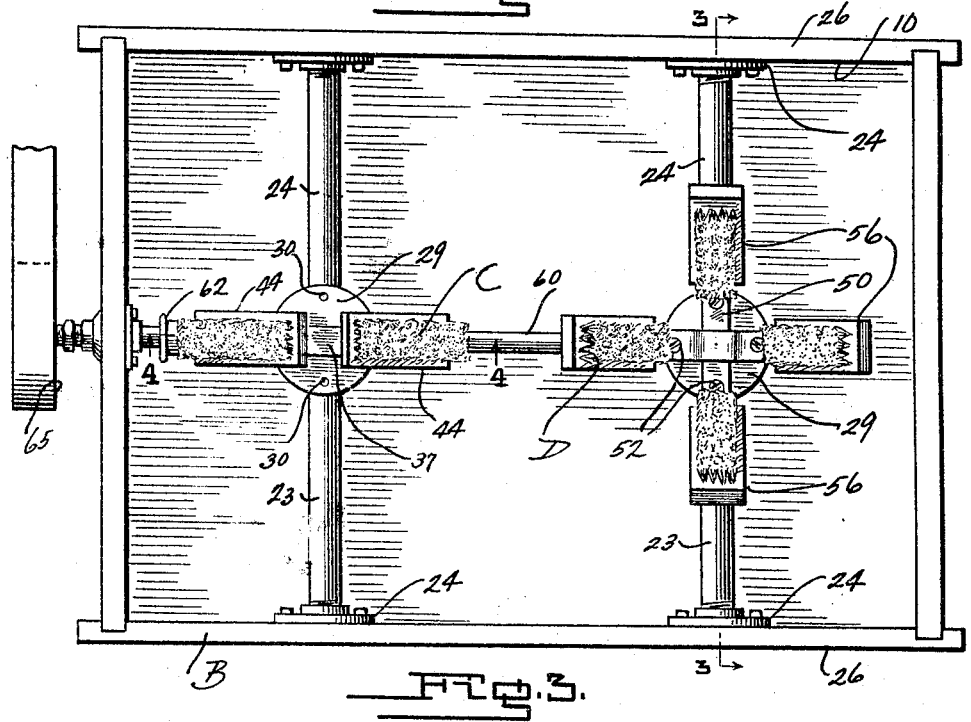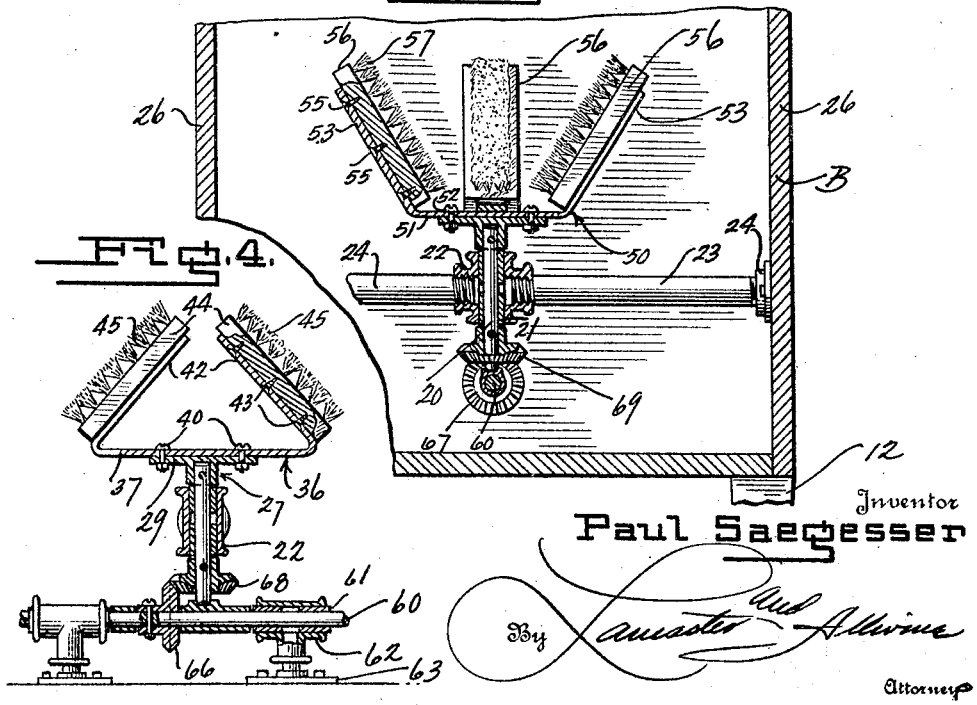

Patented Aug. 11, 1925.

1,548,904

UNITED STATES PATENT OFFICE.

PAUL SAEGESSER, OF HOLLANDALE, WISCONSIN.

CREAM-SEPARATOR-DISK WASHER.

Application filed August 21, 1922. Serial No. 583,263.

*To all whom it may concern:*

Be it known that I, PAUL SAEGESSER, a citizen of the United States, residing at Hollandale, in the county of Iowa and State of Wisconsin, have invented certain new and useful Improvements in Cream-Separator-Disk Washers, of which the following is a specification.

This invention relates to an improved cleansing device adapted for particular use in connection with the washing and sterilizing of the disks of cream separators.

The primary object of the invention is the provision of a relatively simple and effective washing device which includes a plurality of brush heads of varying arrangements, so situated and operated that a person may readily and conveniently cleanse all surfaces of an article to be washed, without undue manual exertion, and in a minimum of time.

A further object of this invention is the provision of a mechanically operated washing mechanism adapted for particular use in creameries and like establishments, for the cleansing of cream separator disks and like articles, embodying a plurality of differently arranged brush heads submerged in a cleansing liquid and adapted to effect a washing operation in a minimum of time and with little manual exertion upon the part of an operator.

A further object of this invention is the provision of a relatively simple and compact washing device, embodying a plurality of brush heads operating upon vertical axes and submerged in a cleansing liquid, thus cooperating with the natural conformation of the hollow frusto-conical shaped cream separator disks which the machine is adapted for washing.

A further object of this invention is the provision of a device of the above described character embodying an operating mechanism, and a plurality of brush heads so connected to the operating mechanism as to equalize thrust and other forces incident to a washing operation.

Other objects and advantages of this invention will of course be apparent during the course of the following detailed description.

In the accompanying drawings, forming a part of this specification, and wherein similar reference characters designate corresponding parts throughout the several views—

Figure 2 is a plan view of the improved washing mechanism.

Figure 3 is a fragmentary cross sectional view, taken substantially on the line 3—3 of Figure 2.

Figure 4 is a cross sectional view, taken substantially on the line 4—4 of Figure 2.

Figure 1:
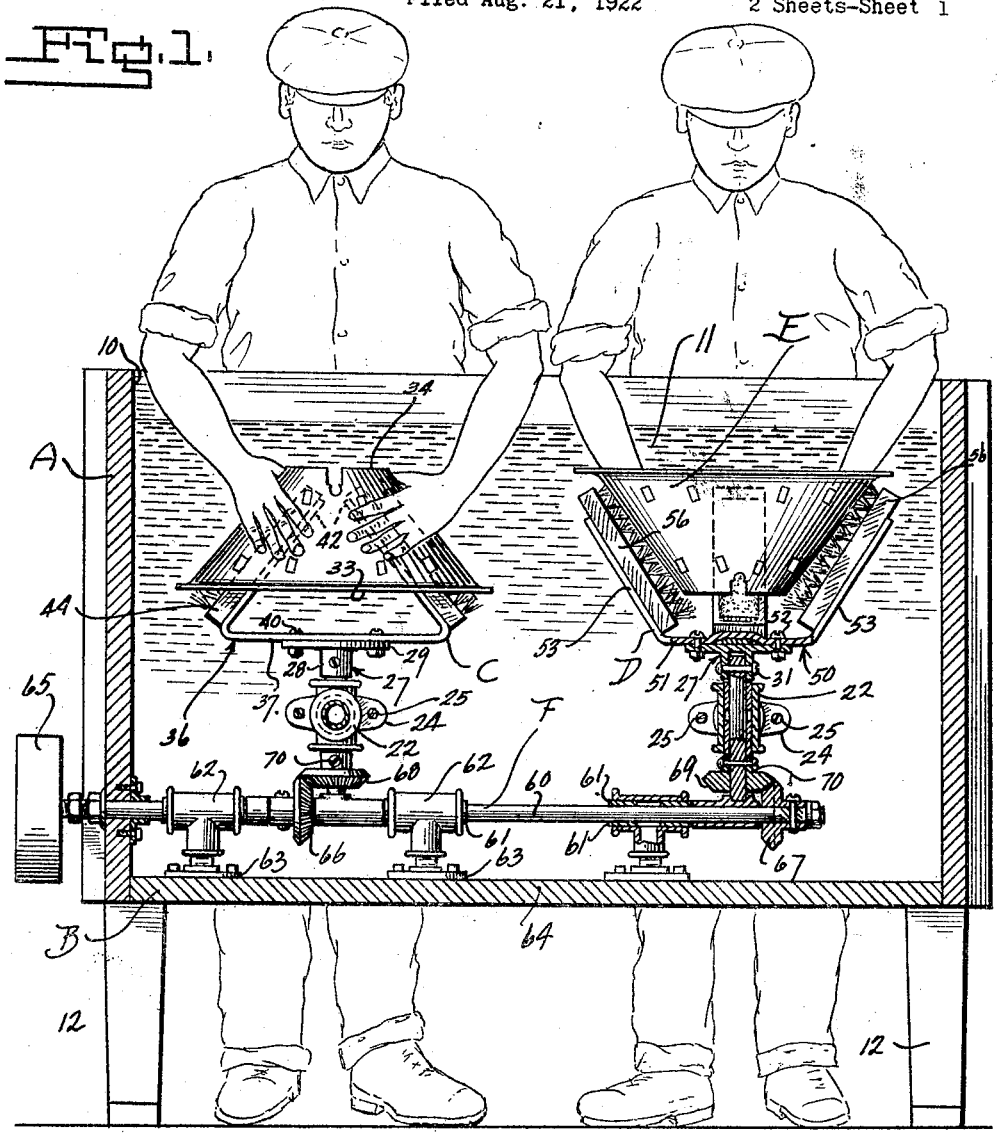
Figure 1 is a cross sectional view, showing the cooperating mechanism of the improved cream separator disk washer, showing the manner in which operators may dispose the disks upon the brush heads thereof for thorough cleansing.

In the drawings, wherein for the purpose of illustration is shown but the preferred embodiment of this invention, the letter A designates the improved cream separator disk washing device, which embodies a tank B, brush heads C and D for cleansing the inner and outer surfaces respectively of cream separator disks E; and operating means F.

Referring to the tank B, the same may be of any construction, including a chamber 10 which is entirely open at the top of the tank B and adapted to receive a body of cleansing liquid 11 therein. The tank B may be supported by legs 12, so that the same is of such height that operators may easily reach through the open top thereof to reach the brush heads C and D.

Referring to the brush heads C and D, they each include a rotary shaft 20 disposed vertically within the chamber 10 of tank B and bearing in a brass bushing 21 carried by a pipe fitting or other suitable support 22. The fitting 22 is provided with oppositely extended horizontally disposed aligning tubes or pipes 23 and 24, which are attached at their outer ends by socket members 24; the latter being connected by suitable retaining element 25 to the side walls 26 of the tank B. The upper end of each vertically disposed shaft 20 is provided with a brush supporting member 27 which includes a sleeve 28 directly receiving the upper end of a shaft 20 and having a horizontally disposed disk head 29 provided with a series of perforations 30 therein, preferably four in number, disposed at 90° apart, and for a purpose which will be more fully set forth hereinafter. The sleeve portion 28 of each supporting member 27 may be attached as by retaining members 31 to the upper end of its rotary shaft 20.

Referring to the construction of the cream separator disk E, which the improved device A is adapted for washing, the same are of the well known construction, being made of sheet metal and frusto-conical in formation, providing a mouth end 33 and an outlet end 34, both of which are open. Due to the inclined walls of the disk E, and to the fact that cream and milk adhere thereto after considerable use, the same are difficult to wash manually.

Referring to the brush arrangement C for the cleansing of the inner surface of the funnel shaped disk E, the same may include a triangular shaped brush supporting bracket 36 which includes a horizontal portion 37 provided with suitable apertures therein adapted for aligning with apertures 30 in the supporting disk 29 therefor, so that the same may receive detachable retaining bolts 40. The triangular brush supporting bar or bracket 36 furthermore includes a pair of upstanding and relatively converging arms 42, which have their upper ends in spaced relation. These arms 42 are provided with suitable apertures for receiving screw elements 43, whereby brush elements 44 may be attached to the outer or upper exposed surfaces of the arms 42 in order that the bristles 45 of said brushes 44 may face the open top of the tank B in converging relation with respect to each other. It is merely necessary to provide a pair of the brushes 44 for the cleansing of the inner surface of the cream separator disks E.

Referring to the construction of the brush arrangement D for cleansing the outer surface of the frusto-conical cream separator disks E, the same preferably includes a pair of substantially U-shaped supporting brackets 50 each including a horizontal portion 51 suitably provided with apertures for aligning with the openings 30 in its supporting disk 29, so that retaining elements 52 may attach said bars or brackets 50 in intersecting relation upon the tops of the supporting disks 29 substantially as is illustrated in the drawings. Each of the U-shaped brackets 50 furthermore include a pair of arms 53 arranged in upwardly diverging relation from the horizontal connecting portion 51, and having suitable apertures for receiving detachable screw members 55 or the like, whereby brushes 56, altogether similar to the brushes 44 above mentioned may be attached to the inside or facing surfaces of said arms 53. The bristles 57 of said brushes 56 are in facing relation, but diverging upwardly from the disk 29 upon which their brackets 50 are supported. The brushes 56 are thus disposed at approximately 90° with respect to each other, so that an operator may conveniently dispose a frusto-conical disk thereon in stable position against liability of displacement during the washing operation.

Referring to the operating mechanism F, the same preferably includes a shaft 60, which may be horizontally disposed within the tank B, being rotatably disposed within bushings 61 which are supported by the T-shaped pipe fittings 62. Suitable supporting bases 63 may be provided upon the floor 64 of the tank B adapted for supporting the T-shaped fittings 62 so that the shaft 60 may be horizontally and rotatably supported within the chamber 10, having an end thereof extending through an end wall of the tank A to support a pulley wheel 65 or similar device exteriorly of the tank B for driving of the shaft 60. Bevelled gears 66 and 67 are preferably supported upon the shaft 60 for the brush arrangements C and D respectively, being respectively in meshing relation with bevelled gears 68 and 69 of the brush head arrangements C and D, said bevelled gears 68 and 69 being supported on the lower ends of the vertical shafts 20 as by means of set screws or retaining pins 70. It is to be noted that the gears 66 and 67 are in meshing relation with the gears 68 and 69 respectively, so that the vertical shafts 20 of the brush arrangements C and D may be rotated in opposite directions. These bevelled gears are so placed that the thrust of the devices C and D incident to a washing operation is toward the outer ends of the shaft 60, thus equalizing forces upon the operating mechanism F as can be readily understood.

In operation, to cleanse the inside of a cream separator disk E, it is merely necessary for an operator to dispose the cream separator disk E over the brushes 44, as is illustrated in Figure 1 of the drawings, and upon operation of said brushes rotating in a horizontal plane, the inner surface of said cream separator disk will be cleansed. On the other hand, when it is desired to cleanse the outer surface of the frusto-conical cream separator disk E, it is merely necessary to invert the same and dispose it upon the bristles 57 of the upwardly diverging brushes 56. Due to the arrangement of the brushes 56, the frusto-conical disk E will find a natural position on the brushes 56 which are rotated in a horizontal plane. Due to the fact that the brushes 44 and 56 are submerged in a cleansing liquid 11, the separator disks E may be readily and quickly cleansed. Since the brush arrangements C and D operate upon vertical axes, the operators may readily dispose the disks E upon the brushes 44 and 56 in a most convenient manner, and practically no manual exertion is required in the washing operation, beyond that of maintaining the discs E in frictional engagement with the brushes, gravity cooperating with the operator in this respect.

Various changes in the shape, size and arrangement of parts may be made to the form of invention herein shown and described, without departing from the spirit of the invention or the scope of the claims.

I claim:

1. A device of the class described comprising a tank, a fitting having a plurality of sockets therein, horizontally disposed supporting arms connected in opposed sockets of said fitting and attached to the sides of said tank for supporting the said fitting upwardly from the bottom of said tank, a shaft vertically carried for rotation within said fitting, a supporting disk horizontally carried in fixed relation upon the upper end of said vertical shaft, and a brush arrangement detachably mounted upon said disk.

2. A device of the character described comprising a tank, a driven shaft, a bearing for said shaft, means connecting said bearing with the sides of said tank upwardly from the floor of said tank and serving to brace the tank whereby said driven shaft is disposed for rotation upon a vertical axis, cleaner means connected with the upper portion of said driven shaft, a drive shaft disposed horizontally in the tank beneath the lower end of said driven shaft and rotatably mounted, a sleeve loose upon the drive shaft and having a socket rotatably receiving the lower end of said driven shaft, and cooperating gears carried by the drive shaft and driven shaft for transmitting rotary movement from the drive shaft to the driven shaft.

3. A washer comprising a tank having the top thereof open and including a floor and side walls, an operating shaft rotatably mounted on a horizontal axis immediately above the floor and having one end portion extending through a side wall of the tank and having means for driving the shaft exteriorly of the tank, shafts arranged on vertical axes in the tank, bearings for supporting said last mentioned shafts within the tank and having supporting means connected with walls of the tank, bearing elements for the lower ends of the vertical shafts loosely mounted upon the horizontally arranged operating shaft, and brush heads carried within the tank by the upper ends of said vertically arranged shafts whereby an operator may insert an article to be washed through the open top of said tank directly upon said brush heads.

4. A washer comprising a tank open at its upper end, horizontally disposed bearings secured to the bottom of said tank, a drive shaft journaled in the bearings and extending through one side of the tank for external operation, vertical bearings positioned in the tank above the drive shaft, and bars leading from the vertical bearings and secured to the sides of the tank, driven shafts journaled in the vertical bearings, cleaner members connected with the upper ends of the driven shafts, and means for transmitting rotary movement from the drive shaft to the driven shafts.

PAUL SAEGESSER.